(12) United States Patent
McCoy et al.

(10) Patent No.: US 9,738,187 B1
(45) Date of Patent: Aug. 22, 2017

(54) VEHICLE SEAT BOTTOM WITH INDEPENDENTLY DEPLOYABLE DEVICES

(71) Applicant: Ford Global Technologies, LLC, Dearborn, MI (US)

(72) Inventors: Robert William McCoy, Ann Arbor, MI (US); Cortney Stancato, Novi, MI (US); Jaeho Cho, Shelby Township, MI (US); Mohammed Shenaq, Dearborn, MI (US)

(*) Notice: Subject to any disclaimer, the term of this patent is extended or adjusted under 35 U.S.C. 154(b) by 0 days.

(21) Appl. No.: 15/049,253

(22) Filed: Feb. 22, 2016

(51) Int. Cl.
  *B60N 2/427* (2006.01)
  *B60N 2/62* (2006.01)
  *B60N 2/44* (2006.01)

(52) U.S. Cl.
  CPC ......... *B60N 2/4279* (2013.01); *B60N 2/4415* (2013.01); *B60N 2/62* (2013.01)

(58) Field of Classification Search
  CPC ...... B60N 2/4279; B60N 2/4415; B60N 2/62; B60N 2/42; B60N 2/42763
  See application file for complete search history.

(56) References Cited

U.S. PATENT DOCUMENTS

| | | | |
|---|---|---|---|
| 4,655,505 A | 4/1987 | Kashiwamura et al. | |
| 6,752,454 B2 | 6/2004 | Ruel et al. | |
| 7,478,873 B2* | 1/2009 | Al-Samarae | B60N 2/0232 280/748 |
| 7,490,899 B2 | 2/2009 | McMillen | |
| 7,708,306 B2* | 5/2010 | Yoshikawa | B60N 2/42763 280/730.1 |
| 7,878,589 B2* | 2/2011 | Murakami | B60N 2/42763 297/216.1 |
| 8,272,687 B2 | 9/2012 | Gross et al. | |
| 8,297,697 B2* | 10/2012 | Gross | B60N 2/4221 297/216.1 |
| 8,641,086 B2* | 2/2014 | Hashido | B60R 21/207 280/730.1 |
| 8,641,140 B2 | 2/2014 | Swierczewski | |

(Continued)

FOREIGN PATENT DOCUMENTS

| | | |
|---|---|---|
| DE | 2006000887 A1 | 5/2007 |
| EP | 1162108 A1 | 12/2001 |

(Continued)

OTHER PUBLICATIONS

Full English machine translation of JPS59075842A, published Apr. 28, 1984, found at: https://www4.j-platpat.inpit.go.jp/eng/tokujitsu/tkbs_en/TKBS_EN_GM101_Top.action; 4 pages.

*Primary Examiner* — Philip Gabler
(74) *Attorney, Agent, or Firm* — Frank MacKenzie; Bejin Bieneman PLC

(57) ABSTRACT

A seat bottom includes a frame, a first thigh support, and a second thigh support. The first thigh support and the second thigh support are each supported by the frame and independently movable relative to the frame. A first deployable device is coupled to the first thigh support, and a second deployable device is coupled to the second thigh support. At least one inflator is in fluid communication with at least one of the first and second deployable devices. The first and second deployable devices are each formed of thermoplastic elastomer and are inflatable from an undeployed position to a deployed position.

20 Claims, 7 Drawing Sheets

(56) References Cited

U.S. PATENT DOCUMENTS

| | | | |
|---|---|---|---|
| 8,888,126 B2* | 11/2014 | Nukaya | B60N 2/42718 280/730.1 |
| 8,919,876 B2 | 12/2014 | Sawada | |
| 2004/0222680 A1 | 11/2004 | Freisler et al. | |
| 2014/0167465 A1* | 6/2014 | Sakata | B60N 2/0284 297/284.11 |
| 2014/0333107 A1 | 11/2014 | Seki et al. | |

FOREIGN PATENT DOCUMENTS

| | | |
|---|---|---|
| EP | 1767397 A2 | 3/2007 |
| GB | 2370222 A | 6/2002 |
| JP | 5975842 | 4/1984 |
| JP | S59075842 A | 4/1984 |
| JP | 3873637 B2 | 1/2007 |

* cited by examiner

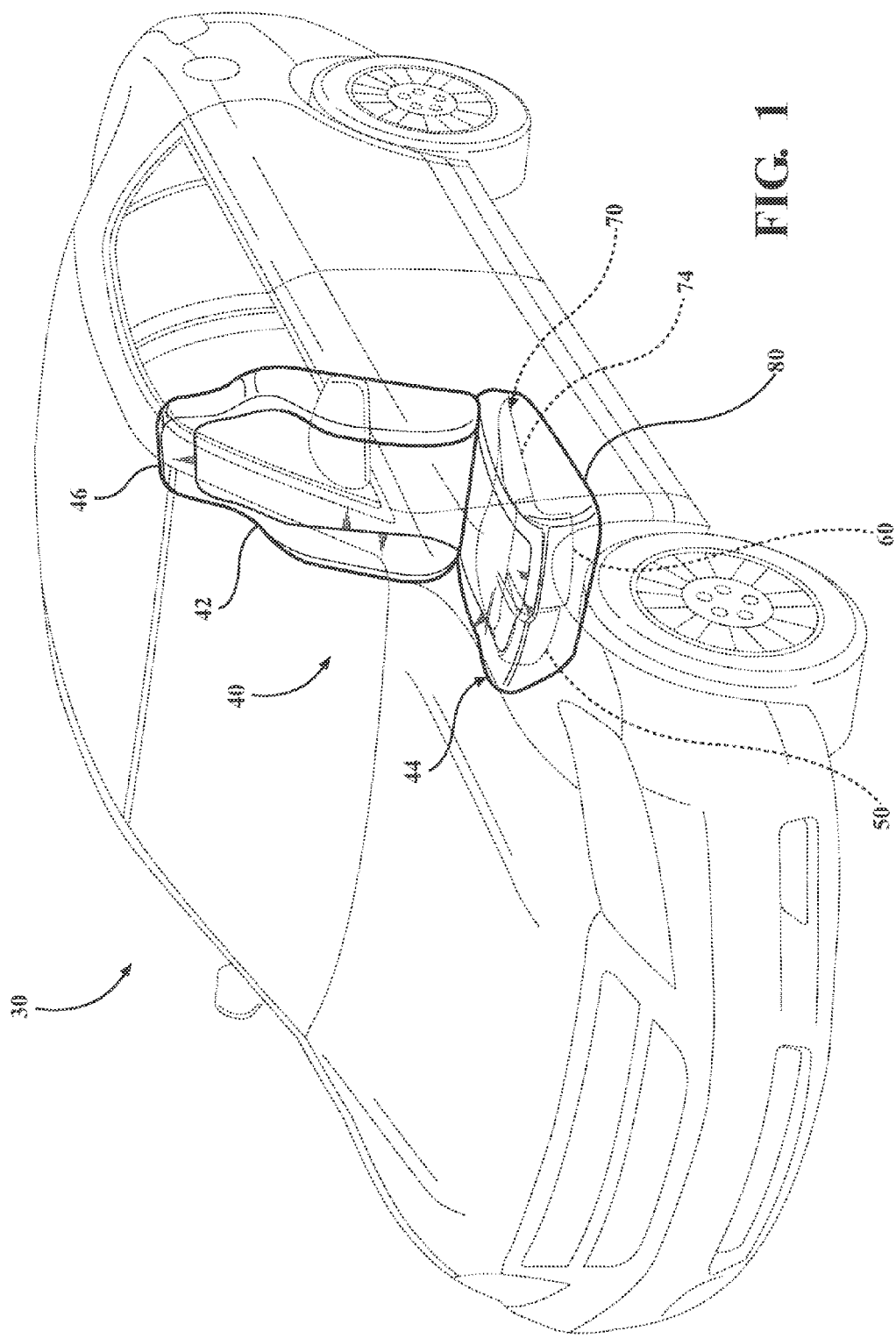

US 9,738,187 B1

VEHICLE SEAT BOTTOM WITH INDEPENDENTLY DEPLOYABLE DEVICES

BACKGROUND

One possible occurrence in a vehicle collision is "submarining." Submarining occurs when the forces from a collision cause an occupant to slide below a lap portion of a seatbelt during a collision, for example, a front-end impact of the vehicle. In such situations where the occupant submarines below the lap portion of the seatbelt, the performance of the seatbelt in restraining the passenger may be compromised.

At the same time, occupants desire vehicle seats that are comfortable. One aspect of comfort is adjustability, by which occupants can change the position of various components of the seat according to their preferences.

What is needed is an anti-submarining measure that accommodates consumer desire for highly adjustable seats.

BRIEF DESCRIPTION OF THE DRAWINGS

FIG. 1 is a perspective view of a vehicle including a vehicle seat.

DETAILED DESCRIPTION

Figure 2A:
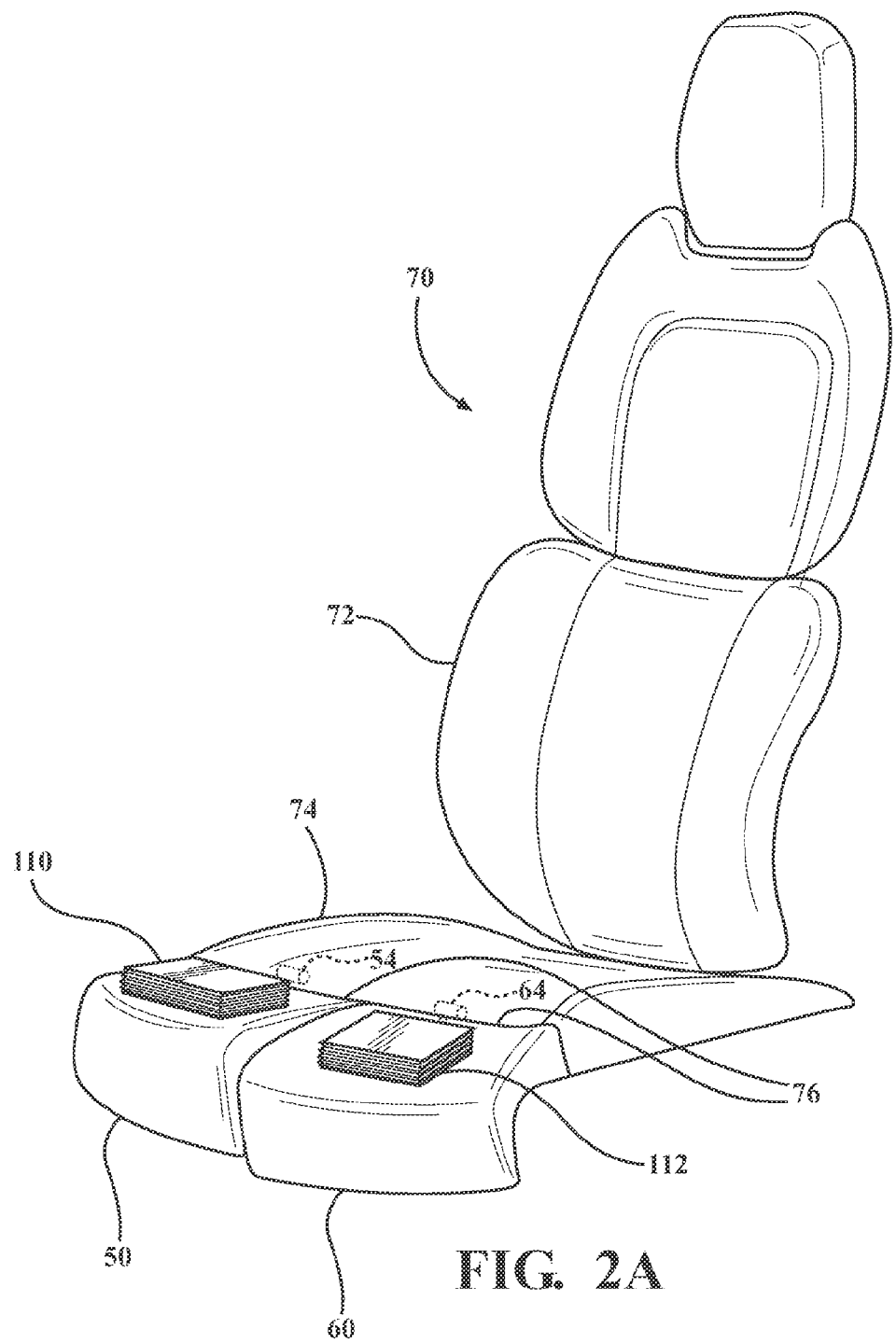
FIG. 2A is a perspective view of a frame of the vehicle seat including deployable devices both in an undeployed position.

With reference to the Figures, wherein like numerals indicate like parts throughout the several views, a seat bottom 44 of a seat 40 of a vehicle 30 is generally shown. The seat bottom 44 includes a frame 70, a first thigh support 50, a second thigh support 60, and a controller 144. The first thigh support 50 and the second thigh support 60 are each supported by the frame 70 and are independently movable relative to the frame 70 to adjustable positions. A first deployable device 110 is coupled to the first thigh support 50, and a second deployable device 112 is coupled to the second thigh support 60. At least one inflator 130 is in fluid communication with at least one of the first and second deployable devices 110, 112. The controller 144 is programmed to independently inflate the first and second deployable devices 110, 112 based at least on the adjustable positions of the first and second thigh supports 50, 60 in response to a sensed vehicle impact.

When deployed, the deployable devices 110, 112 push the thighs of an occupant upward to reduce the likelihood of "submarining" during a vehicle impact, for example, a front-end impact. The deployable devices 110, 112 help position the thighs of the occupant in a position such that the torso of the occupant is restrained by a lap portion of the seatbelt, rather than sliding below the lap portion. Moreover, raising the thighs of the occupant may reduce forward travel of the chest of the occupant, which is the distance that the chest of the occupant leans forward during a collision. Decreased forward travel of the chest may reduce the likelihood of injury to the occupant. At the same time, the independently movable thigh supports 50, 60 permit greater freedom and comfort for the occupant because the occupant can independently support the thighs of the occupant at different angles. A driver, for example, may prefer to keep the first thigh support 50 for the right leg of the occupant, which the occupant uses to press the pedals, higher than the second thigh support 60 for the left leg of the occupant.

With reference to FIG. 1, the seat 40 may include a seat back 42, the seat bottom 44, and a headrest 46. The headrest 46 may be supported by the seat back 42 and may be stationary or movable relative to the seat back 42. The seat back 42 may be supported by the seat bottom 44 and may be stationary or movable relative to the seat bottom 44. The seat back 42, the seat bottom 44, and/or the headrest 46 may be adjustable in multiple degrees of freedom. Specifically, the seat back 42, the seat bottom 44, and/or the headrest 46 may themselves be adjustable, in other words, adjustable components within the seat back 42, the seat bottom 44, and/or the headrest 46, and/or may be adjustable relative to each other.

Figure 2B:
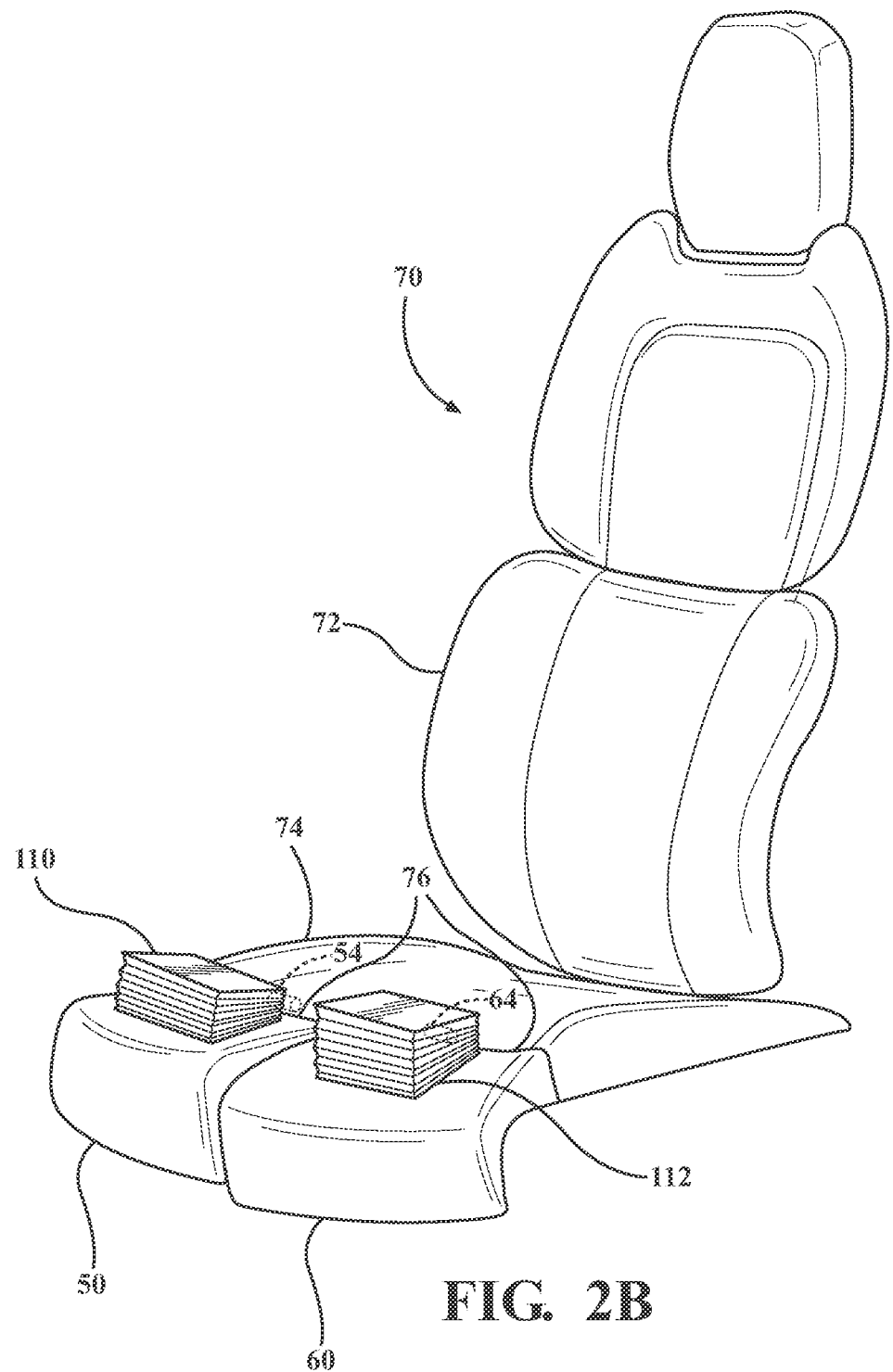
FIG. 2B is the perspective view of FIG. 2A with the deployable devices both in a deployed position.

With reference to FIG. 2, the frame 70 may include a seat back frame 72 and a seat bottom frame 74. The seat back frame 72 may extend generally upwardly from the seat bottom frame 74. The frame 70 may include panels, as shown in FIGS. 2A-B, and/or may include tubes, beams, etc.

The frame 70 may be formed of any suitable plastic material, e.g., carbon fiber reinforced plastic (CFRP), glass fiber-reinforced semi-finished thermoplastic composite (organosheet), etc. Alternatively, for example, some or all components of the frame 70 may be formed of a suitable metal, e.g., steel, aluminum, etc.

The seat 40 may include at least one cushion 80. The cushion 80 is supported on the frame 70, for example, the seat back frame 72 and/or the seat bottom frame 74. The cushion 80 may be made of cushioning material covered with upholstery. The cushioning material may be formed of foam or any other suitable supportive material. The upholstery may be formed of cloth, leather, faux leather, or any other suitable material. The upholstery may be stitched in panels around the foam.

As set forth above, the first thigh support 50 and the second thigh support 60 are each supported by the frame 70. Specifically, the first thigh support 50 and the second thigh support 60 may each be supported by the seat bottom frame 74. The first thigh support 50 and the second thigh support 60 may be cantilevered from the seat bottom frame 74, as shown in FIGS. 2A-B. Alternatively, the first thigh support 50 and the second thigh support 60 may be supported on an underlying portion of the seat bottom frame 74. The first thigh support 50 and the second thigh support 60 may be mirror images of each other and may be otherwise identical. The adjectives "first" and "second" are used throughout this document as identifiers and are not intended to signify importance or order.

As set forth above, the first thigh support 50 and the second thigh support 60 are independently movable relative to the frame 70. The thigh supports 50, 60 may be independently movable relative to the frame 70 to adjustable positions; that is, the occupant may adjust the thigh supports 50, 60 as desired, such as by lifting one leg of the occupant higher than the other. For example, the first and second thigh supports 50, 60 may each be rotatably coupled to the frame 70. The first and second thigh supports 50, 60 may be connected to the seat bottom frame 74 with hinges 76; thus, there may be a hinge 76 between the frame 70 and the first thigh support 50 and a hinge 76 between the frame 70 and the second thigh support 60. The hinges 76 may be, for example, a pin hinge or any other suitable type of hinge.

The seat bottom 44 may include a first actuator 54 supported by the frame 70 and engaged with the first thigh support 50, and a second actuator 64 supported by the frame 70 and engaged with the second thigh support 60. The actuators 54, 64 may include any suitable mechanism for translating mechanical motion to the first thigh support 50 and the second thigh support 60 to independently move the first thigh support 50 and the second thigh support 60 relative to the frame 70, for example, a worm gear driven by a motor, linear actuator, springs, etc. The first actuator 54 and the second actuator 64 may be lockable, e.g., may include a motor, linear actuator, etc., that may be movable to a fixed position.

Figure 4:
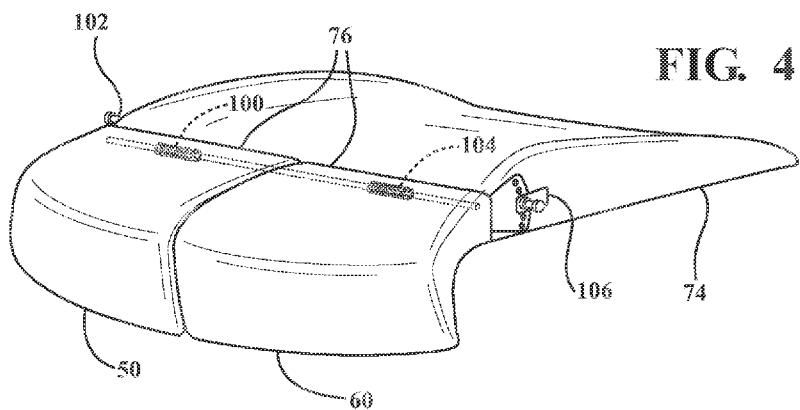
FIG. 4 is a perspective view of an alternative embodiment of the seat bottom frame of the seat bottom.

Alternatively, with reference to FIG. 4, the thigh supports 50, 60 may be adjustable via mechanical means. A first spring 100 may be positioned in compression between the first thigh support 50 and the frame 70, and a first locking mechanism 102 may engage to prevent the first spring 100 from extending. An occupant may position the first thigh support 50 in a desired position and then engage the first locking mechanism 102. Likewise, a second spring 104 may be positioned in compression between the second thigh support 60 and the frame 70, and a second locking mechanism 106 may engage to prevent the second spring 104 from extending.

Figure 5:
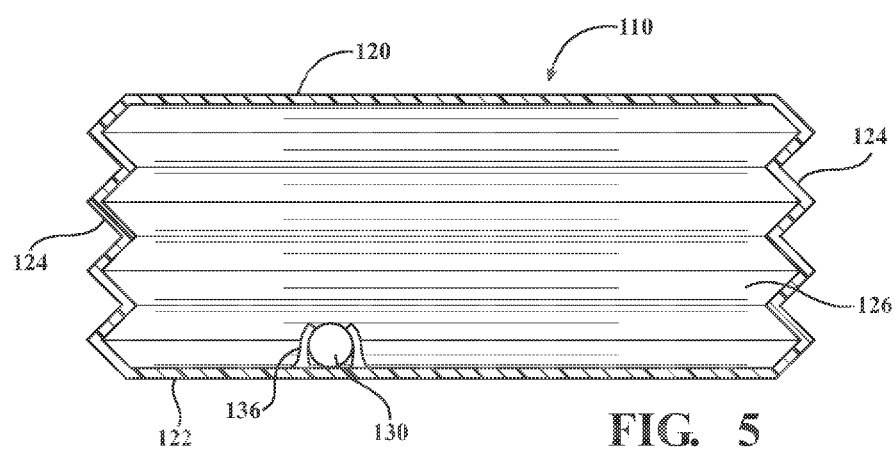
FIG. 5 is a perspective view of a deployable device installed in the seat bottom.

With reference to FIG. 5, the first deployable device 110 may be coupled to the first thigh support 50, and the second deployable device 112 may be coupled to the second thigh support 60. Specifically, the first deployable device 110 may be disposed between the first thigh support 50 and the at least one cushion 80, and the second deployable device 112 may be disposed between the second thigh support 60 and the at least one cushion 80.

The first and second deployable devices 110 and 112 each include a top panel 120, a bottom panel 122, and sides 124. The sides 124 may be folded in the undeployed position and unfolded in the deployed position. At least one of the top panel 120, the bottom panel 122, and the sides 124 may be from 1 to 2 millimeters thick.

The top panel 120, bottom panel 122, and/or the sides 124 may define an inflation chamber 126 for receiving an inflatable medium, such as a gas. When the one of the deployable devices 110, 112 inflates from an undeployed position to a deployed position, the inflatable medium fills the inflation chamber 126, and the top panel 120 extends away from the bottom panel 122, for example, helped by the unfolding of the sides 124.

The first and second deployable devices 110, 112 may be deployable plastic. For example, the first and second deployable devices 110, 112 may be formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The material forming the deployable devices 110, 112 may be solid, in other words, not a woven fabric.

Figure 6:
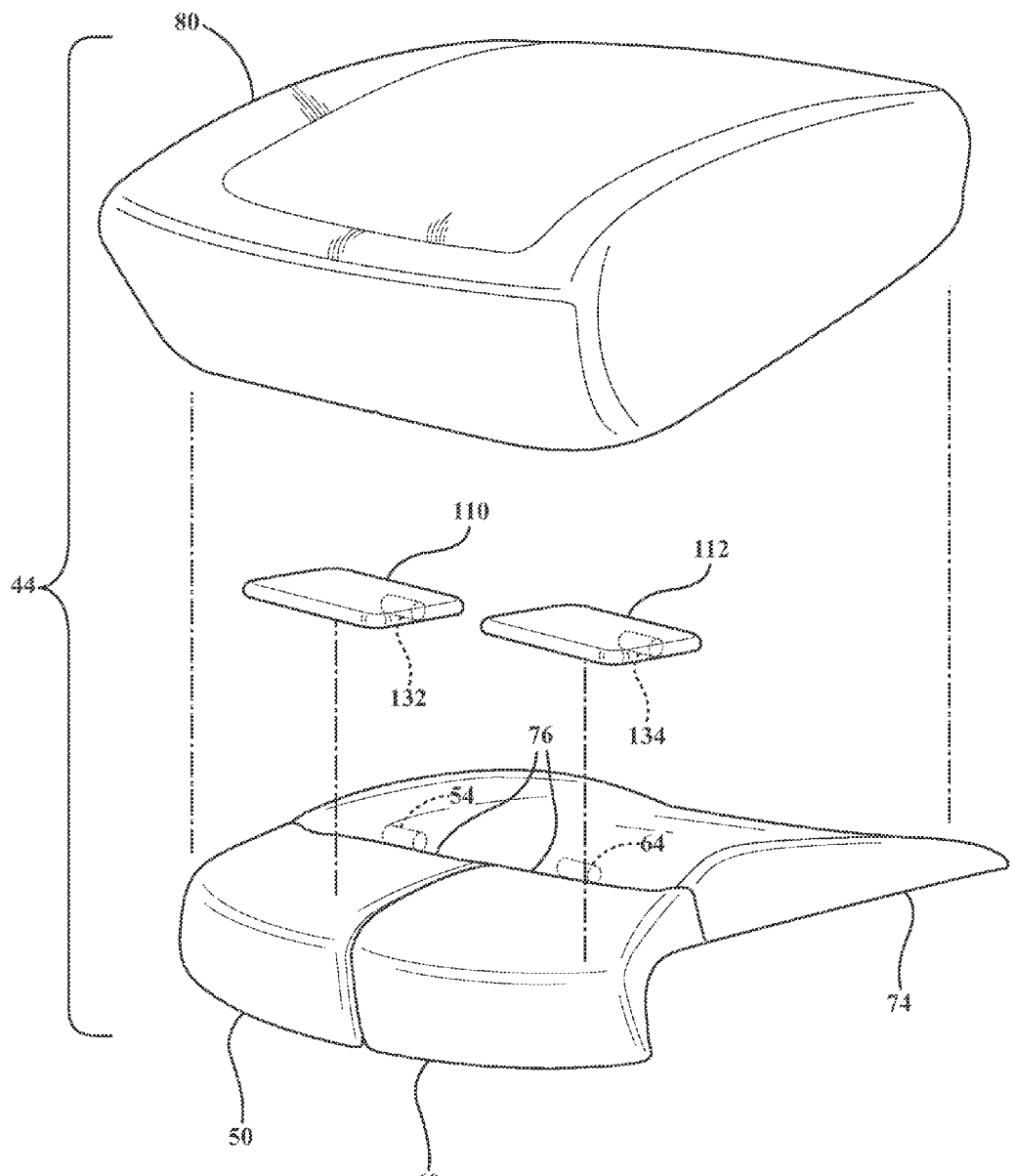
FIG. 6 is an exploded view of an alternative embodiment of the seat bottom of the vehicle seat.

In the alternative to the deployable plastic, the first and second deployable devices 110, 112 may be airbags, as shown in FIG. 6. The deployable devices 110, 112 may be formed of any suitable airbag material, for example, a woven polymer. For example, the deployable devices 110, 112 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The first deployable device 110 may be bonded to the first thigh support 50, and the second deployable device 112 may be bonded to the second thigh support 60. For example, the bottom panel 122 of the first deployable device 110 may be fixed to the first thigh support 50, and the bottom panel 122 of the second deployable device 112 may be fixed to the second thigh support 60. The deployable devices 110, 112 may be bonded to the first and second thigh supports 50, 60 in any suitable fashion. For example, where the thigh supports 50, 60 are formed of a plastic material, the bottom panels 122 may be welded, e.g., ultrasonically welded, to the thigh supports 50, 60. As another example, where the thigh supports 50, 60 are formed of plastic, the bottom panels 122 may be adhered to the thigh supports 50, 60 with structural adhesives, for example, epoxy adhesive, acrylic adhesive, etc. As yet another example, the bottom panels 122 may be both adhered and welded to the thigh supports 50, 60, e.g., for hybrid thigh supports 50, 60 formed of multiple material types. In any event, the weld and/or adhesive is configured to hold the bottom panels 122 of the deployable devices 110, 112 to the thigh supports 50, 60 in both the undeployed position and the deployed position. In addition to, or in the alternative to bonding, the first deployable device 110 and the second deployable device 112 may be mechanically fastened to the first thigh support 50 and the second thigh support 60, for example, with clips, push pins, threaded fasteners, etc.

At least one inflator 130 is in fluid communication with at least one of the first and second deployable devices 110, 112. As set forth further below, the inflator 130 may selectively inflate the deployable devices 110, 112 with an inflatable medium, such as a gas. The inflator 130 may be, for example, a pyrotechnic inflator 130 that uses a chemical reaction to drive inflation medium to the deployable devices 110, 112. The inflator 130 may be of any suitable type, for example, a cold-gas inflator.

The at least one inflator 130 may be further defined as a first inflator 132 in fluid communication with the first deployable device 110 and a second inflator 134 in communication with the second deployable device 112. Alternatively, the inflator 130 may be a single inflator 130 in fluid communication with both the first and the second deployable devices 110, 112.

Figure 3:
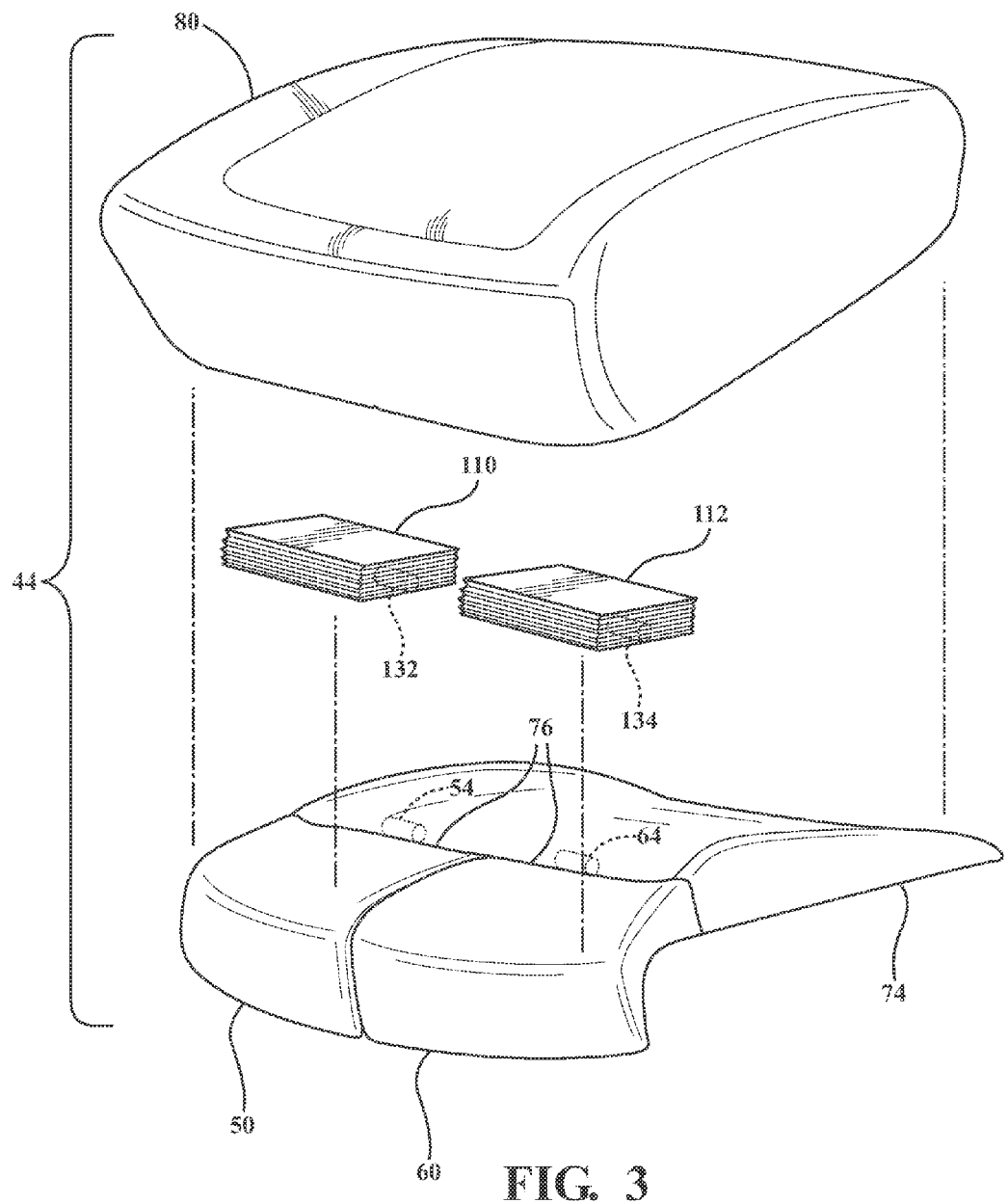
FIG. 3 is an exploded view of a seat bottom of the vehicle seat.

The inflator 130 may be disposed in the inflation chamber 126 of the deployable devices 110, 112, as shown in FIGS. 3 and 5, or may be located exterior to the inflation chamber 126 and connected to the inflation chamber 126 with a fill tube (not shown). With reference to FIG. 5, a clip 136 may be supported on the bottom panel 122 and may engage the inflator 130. The clip 136 may be disposed in the inflation chamber 126. The clip 136 may be, for example, integral with the bottom panel 122, i.e., simultaneously formed together as a single unit. For example, the clip 136 and the bottom panel 122 may be molded together in a single molding process.

Figure 7:
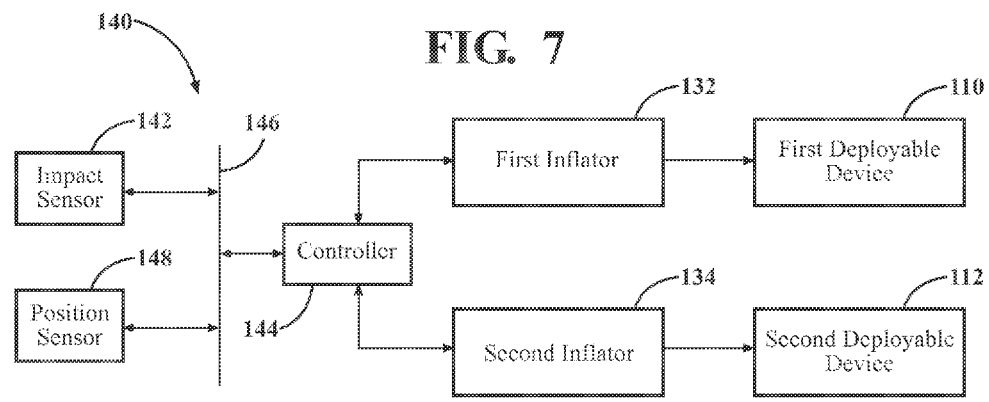
FIG. 7 is a block diagram of a control system of the vehicle.

With reference to FIG. 7, the vehicle 30 includes a control system 140 that may include at least one impact sensor 142 for sensing an impact of the vehicle 30, and a controller 144 in communication with the sensor 142 and the inflator 130 for activating the inflator 130, for example, by providing an impulse to a pyrotechnic charge of the inflator 130, when the sensor 142 senses an impact of the vehicle 30. Alternatively or additionally to sensing impact, the control system 140 may be configured to sense an impending impact prior to the actual impact, that is, pre-impact sensing.

The impact sensor 142 may be in communication with the controller 144. The impact sensor 142 is adapted to detect an impact to the vehicle 30. The sensor 142 may be of any suitable type, for example, post-contact sensors such as accelerometers, pressure sensors, and contact switches; and pre-impact sensors such as radar, lidar, or vision-sensing systems. The vision systems may include one or more cameras, CCD image sensors, CMOS image sensors, etc. The sensor 142 may be located at numerous points in or on the vehicle 30.

The controller 144 may be a microprocessor-based controller. The impact sensor 142 may be in communication with the controller 144 to communicate data to the controller 144. The controller 144 may inflate the deployable devices 110, 112 by instructing the inflator 130 to push inflatable medium into the deployable devices 110, 112. The controller 144 may include a processor, memory, etc. The memory of the controller 144 may store instructions executable by the processor.

The control system 140 may transmit signals through a communication network 146 (such as a controller area network (CAN) bus), Ethernet, and/or by any other wired or wireless communication network. The controller 144 may use information from the communication network 146 to control the activation of the inflator 130. The inflator 130 may be connected to the controller 144, as shown in FIG. 7, or may be connected directly to the communication network 146.

The controller 144 may be programmed to receive at least one signal indicating a position of the first thigh support 50 and a position of the second thigh support 60. The controller 144 may specifically be programmed to receive at least one signal indicating a position of the first actuator 54 and the second actuator 64. The position signal may be provided by a position sensor 148 in communication with the controller 144 through the communication network 146. The position sensor 148 may be suitably disposed in the seat bottom 44 to detect the positions of the first and second thigh supports 50, 60. The position sensor 148 may be of any suitable type, e.g., a Hall effect sensor, a linear variable differential transformer (LVDT), a proximity encoder, etc.

The controller 144 may be programmed to inflate at least one of the first and second deployable devices 110, 112 in response to a sensed vehicle impact. In other words, the controller 144 may provide a signal, directly or indirectly, to the inflator 130. Specifically, the controller 144 may be programmed to independently inflate the first and second deployable devices 110, 112 based at least on the adjustable positions of the first and second thigh supports 50, 60 in response to a sensed vehicle impact. For example, if the occupant has adjusted the seat 40 so that the first thigh support 50 is raised higher than the second thigh support 60, then the controller 144 may instruct both deployable devices 110, 112 to inflate but instruct the second deployable device 112 to inflate more than the first deployable device 110 so that the deployable devices 110, 112 push up both legs of the occupant to the same height. In other words, the controller 144 may provide at least one signal to independently inflate the first deployable device 110 and the second deployable device 112 such that the top panel 120 of the first deployable device 110 and the second deployable device 112 are in a common plane, as shown in FIG. 2B. In the alternative, or in addition, the controller 144 may be programmed to independently inflate the first and second deployable devices 110, 112 based at least on a sensed direction of the sensed vehicle impact, the size of the occupant, the crash mode, the crash severity, etc.

Figure 8:
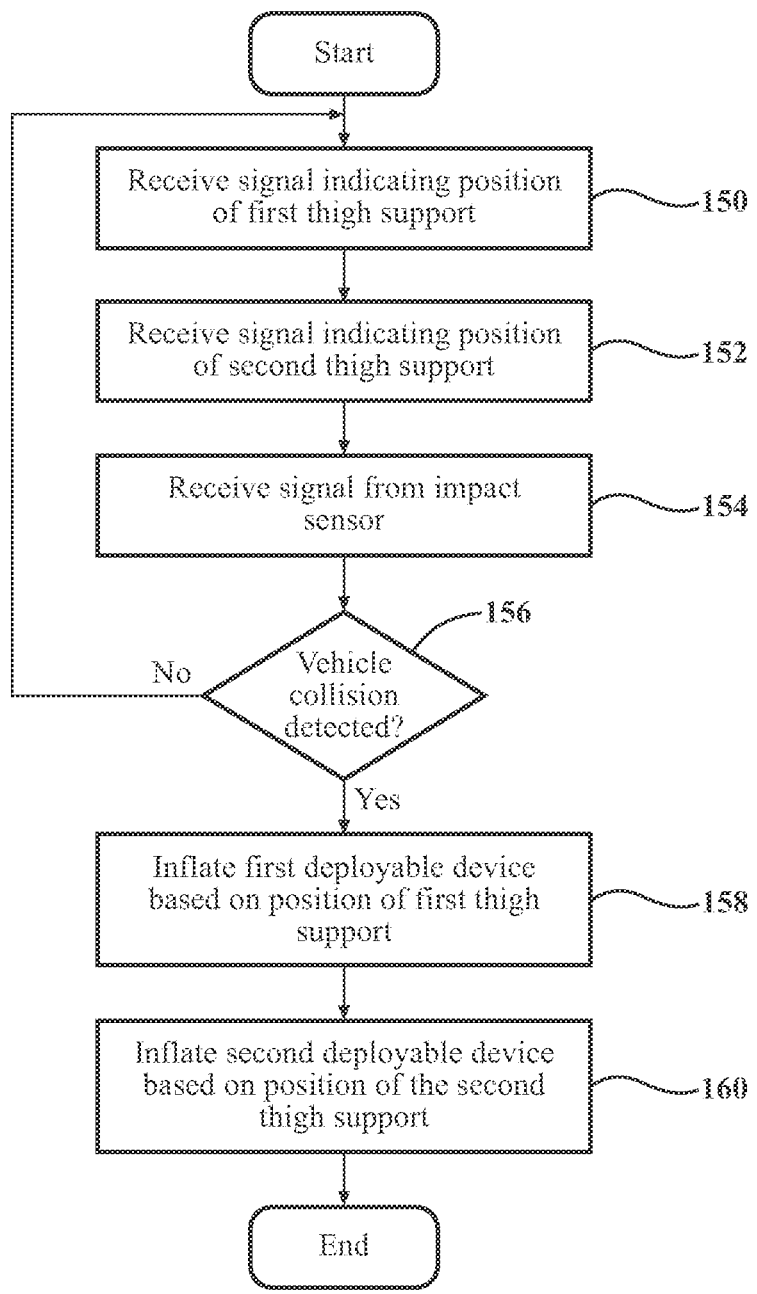
FIG. 8 is a flowchart for a controller of the control system of the vehicle.

With reference to FIG. 8, the controller 144 may receive a signal indicating the position of the first thigh support 50, as shown in block 150, and may receive a signal indicating the position of the second thigh support 60, as shown in block 152. Specifically, the controller 144 may receive a signal from the position sensor 148, as set forth above, indicating the position of the first thigh support 50 and the second thigh support 60. As another example, the controller 144 may receive a signal from the first actuator 54 and the second actuator 64, as set forth above, indicating the position of the first thigh support 50 and the second thigh support 60.

The controller 144 may receive a signal indicating whether the vehicle 30 has been or is about to be involved in an impact. Specifically, the controller 144 may receive a signal from the impact sensor 142, as shown in block 154, detecting the presence or absence of a collision.

The controller 144 may then query whether a collision has occurred or is about to occur, as shown in decision block 156, based on the signal from the impact sensor 142. If no collision is detected, then the controller 144 may continue monitoring signals indicating the positions of the thigh supports 50, 60 and signals from the impact sensor 142, as shown in blocks 150, 152, 154.

If a collision is detected, the controller 144 may inflate the first and second deployable devices 110, 112, as shown in blocks 158 and 160. The controller 144 may base whether and how much to inflate the first deployable device 110 on the position of the first thigh support 50, and the controller 144 may base whether and how much to inflate the second deployable device 112 on the position of the second thigh support 60. As described above, when determining the inflation levels, the controller 144 may take into account the positions of the thigh supports 50, 60; the sensed direction of the sensed vehicle impact; the size of the occupant; the crash mode; the crash severity; and/or other factors.

In the event that the vehicle 30 is in a collision, the impact sensor 142 detects the collision and signals the controller 144 through the communication network 146. The controller 144 instructs the inflator 130 through the communication network 146 to inflate the first deployable device 110, the second deployable device 112, or both deployable devices 110, 112. The controller 144 may instruct the inflator 130 to inflate one of the deployable devices 110, 112 more than the other. The inflator 130 inflates one or both of the deployable devices 110, 112 by pushing inflatable medium into the inflation chambers 126 of the deployable devices 110, 112. The deployable devices 110, 112 inflate from an undeployed position to a deployed position. The deployable devices 110, 112 push the thighs of the occupant sitting in the seat 40 upwards. If the occupant had adjusted one of the thigh supports 50, 60 higher than the other, then the deployable devices 110, 112 may push the thighs up by unequal distances to the same height relative to the seat bottom frame 74. The raised thighs reduce the likelihood that the occupant "submarines" and helps to reduce forward travel of the chest of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat bottom comprising:
a frame;
a first thigh support and a second thigh support each supported by the frame and independently movable relative to the frame;
a first deployable device coupled to the first thigh support;
a second deployable device coupled to the second thigh support;
at least one inflator in fluid communication with at least one of the first and second deployable devices;
a first actuator supported by the frame and including a motor to move the first thigh support relative to the frame; and
a second actuator supported by the frame and including a motor to move the second thigh support relative to the frame;
the first and second deployable devices each being formed of thermoplastic elastomer and being inflatable from an undeployed position to a deployed position.

2. A seat bottom according to claim 1, wherein each of the first and second thigh supports is rotatably coupled to the frame.

3. A seat bottom according to claim 1, further comprising a hinge between the frame and the first thigh support, and a hinge between the frame and the second thigh support.

4. A seat bottom according to claim 1, wherein the at least one inflator is further defined as a first inflator in fluid communication with the first deployable device and a second inflator in fluid communication with the second deployable device.

5. A seat bottom according to claim 1, further comprising at least one cushion supported by the frame, wherein the first deployable device is disposed between the first thigh support and the at least one cushion, and wherein the second deployable device is disposed between the second thigh support and the at least one cushion.

6. A seat bottom according to claim 1, wherein the first deployable device is bonded to the first thigh support and the second deployable device is bonded to the second thigh support.

7. A seat bottom according to claim 1, wherein the first and second deployable devices each includes a top panel, a bottom panel, and sides folded in an undeployed position and unfolded in a deployed position.

8. The seat bottom according to claim 7, wherein the bottom panel of the first deployable device is fixed to the first thigh support, and the bottom panel of the second deployable device is fixed to the second thigh support.

9. The seat bottom according to claim 8, wherein at least one of the top panel and the bottom panel are from 1 to 2 millimeters thick.

10. A vehicle restraint system comprising:
a frame;
a first thigh support and a second thigh support each supported by the frame and independently movable relative to the frame;
a first deployable device coupled to the first thigh support;
a second deployable device coupled to the second thigh support;
the first and second deployable devices each being formed of thermoplastic elastomer and being inflatable from an undeployed position to a deployed position; and
at least one inflator in fluid communication with at least one of the first and second deployable devices; and
a controller programmed to inflate at least one of the first and second deployable devices in response to a sensed vehicle impact;
wherein each of the first and second thigh supports is rotatably coupled to the seat bottom frame, and wherein the controller is programmed to receive at least one signal indicating a position of the first thigh support and a position of the second thigh support.

11. The vehicle restraint system according to claim 10, further comprising an impact sensor in communication with the controller.

12. The vehicle restraint system according to claim 10, wherein the at least one inflator is further defined as a first inflator in fluid communication with the first deployable device and a second inflator in fluid communication with the second deployable device.

13. The vehicle restraint system according to claim 10, further comprising at least one cushion supported by the frame, wherein the first deployable device is disposed between the first thigh support and the at least one cushion, and wherein the second deployable device is disposed between the second thigh support and the at least one cushion.

14. The vehicle restraint system according to claim 10, wherein the first and second deployable devices each includes a top panel, a bottom panel, and sides folded in an undeployed position and unfolded in a deployed position.

15. The vehicle restraint system according to claim 14, wherein the bottom panel of the first deployable device is fixed to the first thigh support and the bottom panel of the second deployable device is fixed to the second thigh support.

16. A vehicle restraint system comprising:
a frame;
a first thigh support and a second thigh support each supported by the frame and independently movable relative to the frame;
a first deployable device coupled to the first thigh support;
a second deployable device coupled to the second thigh support;
the first and second deployable devices each being formed of thermoplastic elastomer and being inflatable from an undeployed position to a deployed position; and
at least one inflator in fluid communication with at least one of the first and second deployable devices;
a controller programmed to inflate at least one of the first and second deployable devices in response to a sensed vehicle impact;
a first actuator supported by the seat bottom frame and engaged with first thigh support; and
a second actuator supported by the seat bottom frame and engaged with the second thigh support;
wherein the controller is programmed to receive at least one signal indicating a position of the first actuator and the second actuator.

17. The vehicle restraint system of claim 16, further comprising an impact sensor in communication with the controller.

18. The vehicle restraint system of claim 16, wherein the at least one inflator is further defined as a first inflator in fluid communication with the first deployable device and a second inflator in fluid communication with the second deployable device.

19. The vehicle restraint system of claim 16, further comprising at least one cushion supported by the frame, wherein the first deployable device is disposed between the first thigh support and the at least one cushion, and wherein the second deployable device is disposed between the second thigh support and the at least one cushion.

20. The vehicle restraint system of claim 16, wherein the first and second deployable devices each includes a top panel, a bottom panel, and sides folded in an undeployed position and unfolded in a deployed position.

* * * * *